May 29, 1945.　　D. G. GRISWOLD　　2,377,227
PRESSURE RESPONSIVE VALVE
Filed June 4, 1941.　　6 Sheets-Sheet 1

Inventor
Donald G. Griswold
By Bacon + Thomas
Attorneys

May 29, 1945. D. G. GRISWOLD 2,377,227
PRESSURE RESPONSIVE VALVE
Filed June 4, 1941 6 Sheets-Sheet 2
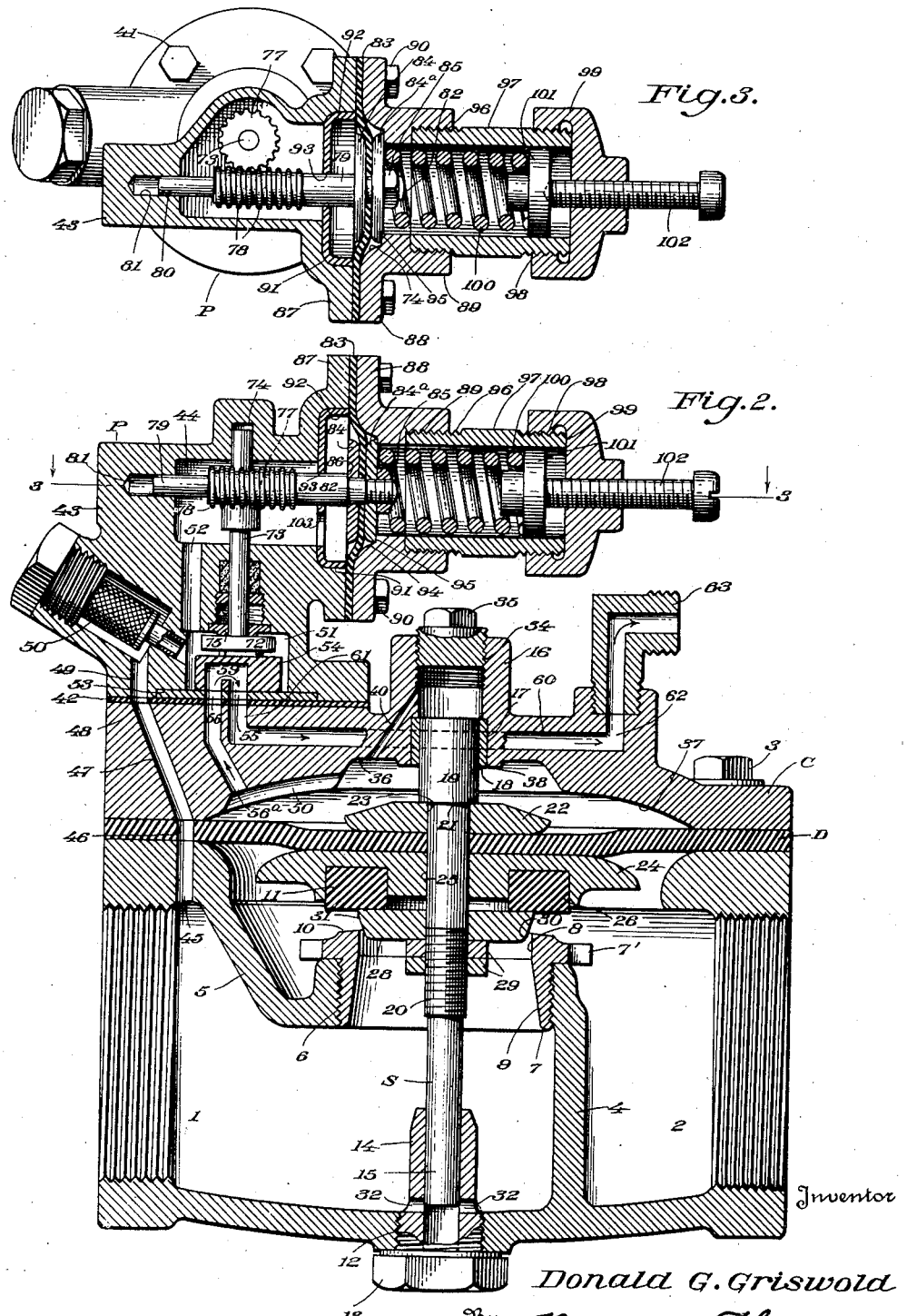
Inventor
Donald G. Griswold
By Bacon & Thomas
Attorneys May 29, 1945.  D. G. GRISWOLD  2,377,227
PRESSURE RESPONSIVE VALVE
Filed June 4, 1941  6 Sheets-Sheet 3

Inventor
Donald G. Griswold
By Bacon + Thomas
Attorneys

May 29, 1945. D. G. GRISWOLD 2,377,227
PRESSURE RESPONSIVE VALVE
Filed June 4, 1941 6 Sheets-Sheet 4

Inventor
Donald G. Griswold
By Bacon + Thomas
Attorneys

May 29, 1945. D. G. GRISWOLD 2,377,227
PRESSURE RESPONSIVE VALVE
Filed June 4, 1941 6 Sheets-Sheet 5
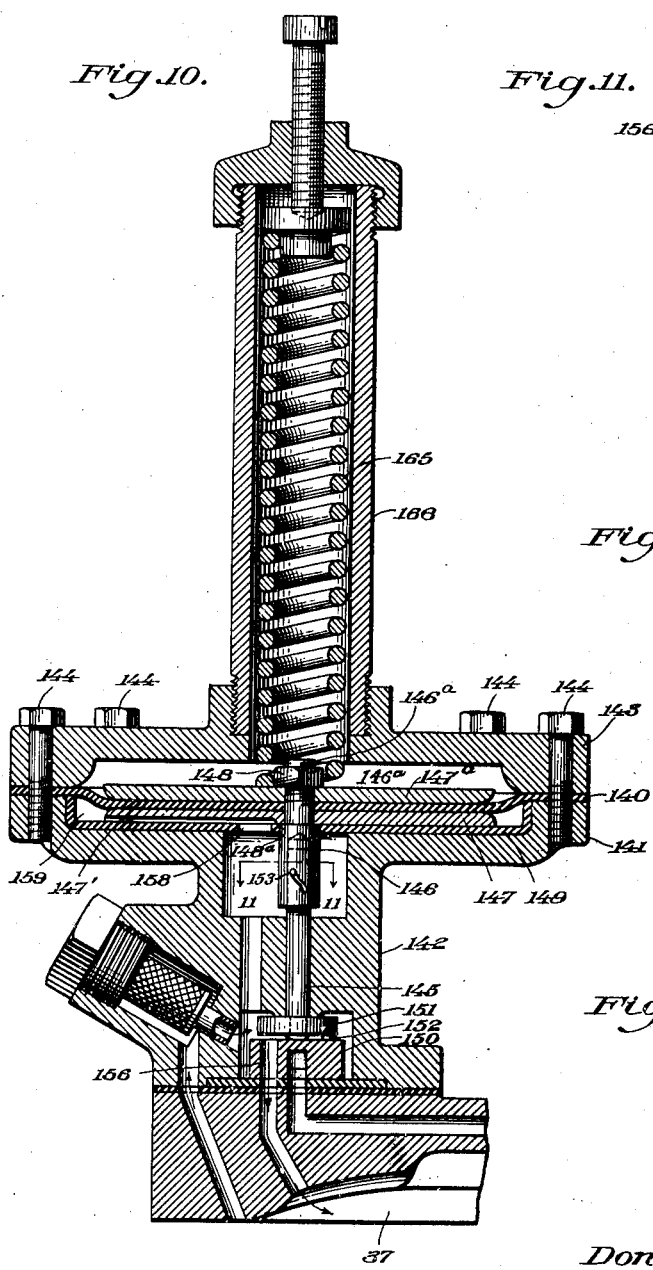
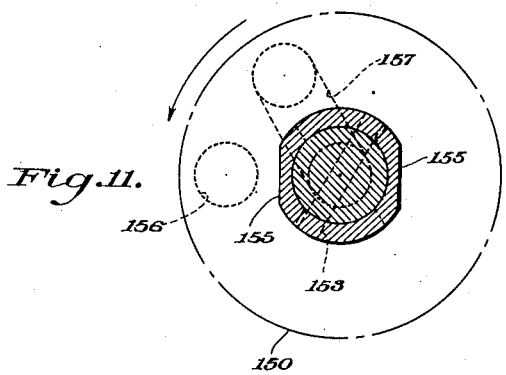
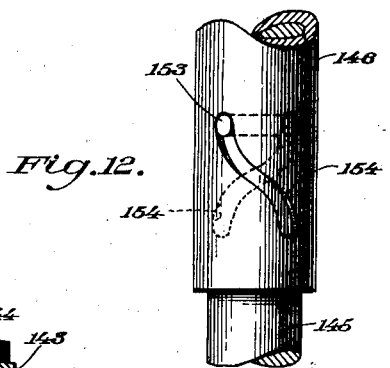
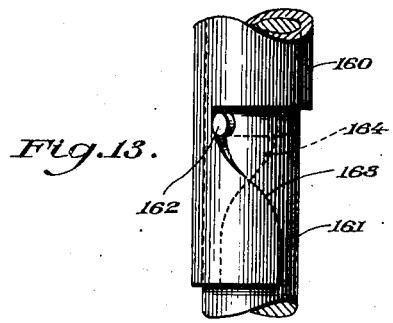
Inventor
Donald G. Griswold
By Bacon + Thomas
Attorneys May 29, 1945.  D. G. GRISWOLD  2,377,227
PRESSURE RESPONSIVE VALVE
Filed June 4, 1941  6 Sheets-Sheet 6

Inventor
Donald G. Griswold
By Bacon + Thomas
Attorneys

Patented May 29, 1945

2,377,227

UNITED STATES PATENT OFFICE 2,377,227

PRESSURE RESPONSIVE VALVE

Donald G. Griswold, Alhambra, Calif.

Application June 4, 1941, Serial No. 396,628

6 Claims. (Cl. 137—53)

The present invention relates to valves, and more particularly to automatic pressure responsive valves of the pilot-controlled type.

More specifically, the invention relates to automatic pilot-controlled pressure relief valves and/or automatic pilot-controlled pressure regulating valves.

The invention further relates to a pressure regulating valve adapted to serve as an automatic altitude valve to control the liquid level in a remote, elevated tank or reservoir.

The invention still further relates to novel pilot valve means for automatically controlling pressure relief valves and/or pressure regulator valves.

One of the principal objections to known and conventional relief valves is the great amount of force required to operate the same. Another and more serious objection to such valves is their tendency to leak. A still further objection is that the rate of flow through the valve is seriously reduced by the throttling effect caused by the spring load.

Conventional pressure relief valves usually include a compression spring adjusted so that the valve will open when a given pressure is attained in the line. If the valve is set to release or open at, say, 100 pounds pressure, a spring load of 100 pounds would be required to hold the valve closed. In the operation of such valves, as the pressure increases in the inlet chamber or opening of the valve to, say, 99½ pounds, instead of there being a very substantial closing force available to insure sealing of the valve, there would only be a one-half pound spring load, and consequently there is a great tendency for such valves to leak. As the pressure in the inlet chamber further increases to slightly over 100 pounds, or, in other words, when the pressure becomes sufficient to overcome the action of the spring tending to close the valve, the valve will open, but the rate of flow of fluid through the valve is restricted by the spring load on the valve disc and the fluid is, therefore, required to continually compress the spring in order to force and maintain an opening for itself through the valve. Thus, the rate of flow of fluid through the valve, even when the valve should be wide open, is reduced and throttled because the fluid is required to continually buck the spring load.

In contrast with the above, and notwithstanding the fact that a spring load is used, valves constructed in accordance with the present invention are arranged so that they are either completely opened or completely closed, without any possibility of leakage occurring when the valve is in its closed position, or at a time when the pressure in the inlet opening of the main valve very closely approaches the predetermined pressure for which the valve is set to open. Furthermore, once the predetermined pressure is attained, the valve assumes a wide open position and a maximum rate of flow is allowed because the flow is not counteracted or throttled in any way by the spring load.

These advantages are made possible by the use of a pilot valve which is operable by a very small force. This pilot valve is extremely sensitive and yet positive in its control of the main valve. If it is assumed, for illustration, that valves of the present invention are set to relieve or regulate pressures in excess of 100 pounds, only a few ounces of force will in any event be required to operate the pilot valve. Therefore, at a pressure of, say, 99½ pounds, the main valve will be held positively closed; at slightly over 100 pounds, the increase in pressure will have been sufficient to operate the pilot valve and the main valve will then be permitted to open wide and to remain wide open until the pressure again drops to, say, 99½ pounds, whereupon the pilot valve will be again operated to completely close the main valve.

The same principles applicable to relief valves apply to pressure regulating valves, and both types of valves are contemplated by the present invention and, accordingly, have been disclosed herein. In the case of an altitude valve, the spring will be set to maintain the desired static head in the storage tank.

One of the principal objects of the invention is to provide valve means which can be operated by a very small force, irrespective of the size of the valve or the predetermined pressure for which the valve is set to operate.

Another object of the invention is to provide valve means which utilizes the pressure in its inlet opening (or outlet opening, as the case may be) to effect automatic opening and closing of the valve.

A further object of the invention is to provide pressure responsive valve means which is positive in its operation and which will not waver or flutter between open and closed positions, but which in normal operation will be either completely closed or fully opened; complete closing avoiding undesirable leakage through the valve, and full opening enabling the valve to operate with the maximum efficiency without restricting or impeding flow therethrough.

Another object of the invention is to provide automatic relief and/or pressure regulating valves arranged to operate efficiently and quietly and to open and close automatically in accordance with the pressures for which they have been set.

Another object of the invention is to provide a pressure relief valve and/or a pressure regulating valve constructed so that the range of the valve may be readily varied, as by substituting a different spring and a standard pipe nipple of suitable length to meet various conditions encountered in practice.

Still another object of the invention is to provide an automatic altitude valve for controlling liquid level in an elevated tank.

A further object of the invention is to provide a sensitive pilot valve means.

A further object of the invention is to provide mechanism for rotating a pilot disc through a given angle to effect opening and closing of a main valve.

A still further object of the invention is to provide diaphragm-operated pilot valves arranged so that the operating diaphragm is disposed in a vertical, or a horizontal plane, as desired.

Other objects and advantages of the invention will be apparent from the following description taken in conjunction with the accompanying drawings, in which:

Figure 2 is a view of the same valve, but with the valve disc of the main valve shown during its opening movement, and with the pilot disc and diaphragm of the pilot valve in a corresponding position;

Figure 3 is a sectional view taken on the line 3—3 of Figure 2, more particularly illustrating the details of the mechanism for operating the pilot disc;

Figure 6:
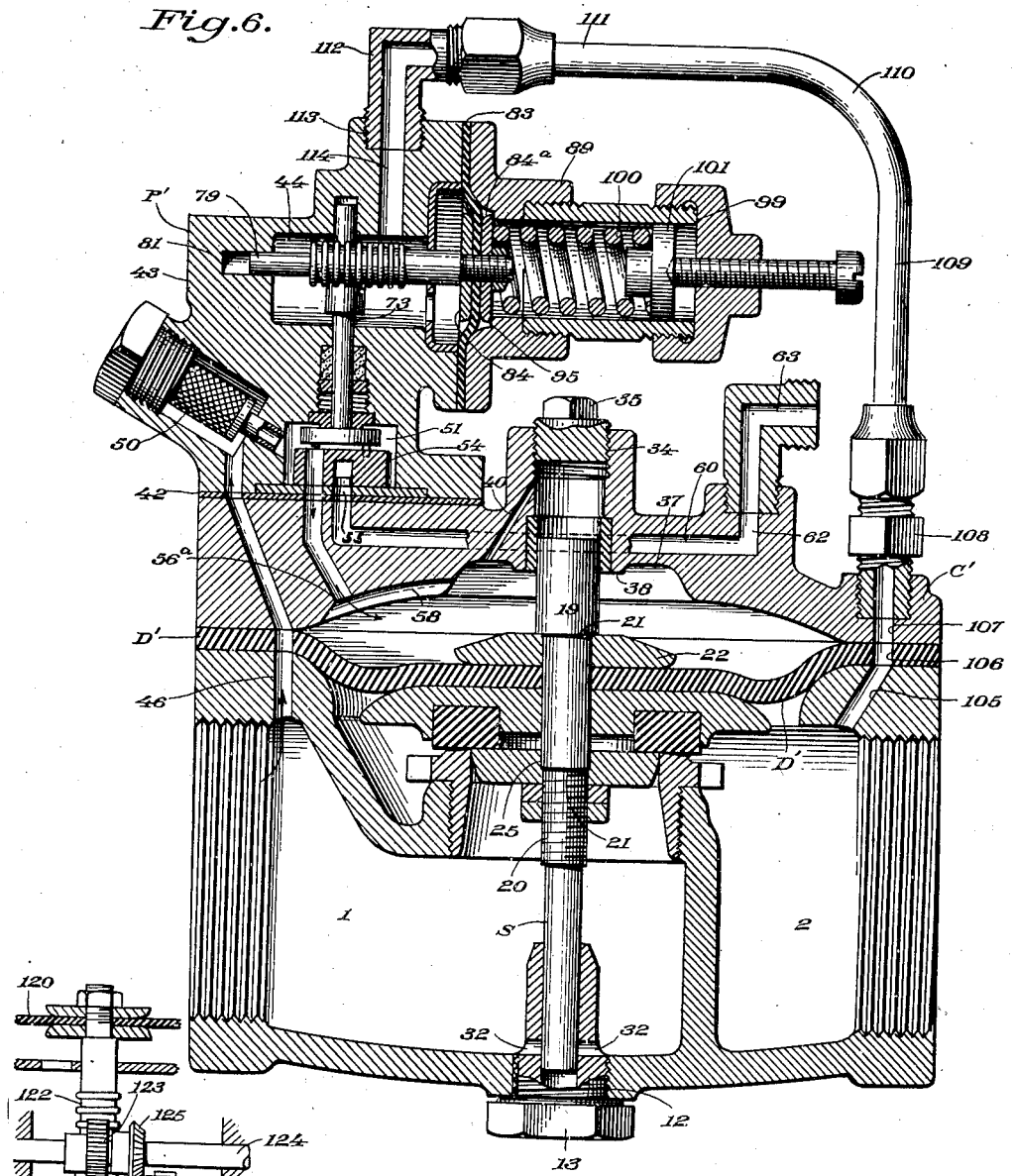
Figure 6 illustrates a pressure regulating valve in its closed position, a modified form of pilot valve being here employed (the main pressure chamber of the pilot valve being shown connected with the outlet side of the main valve, instead of with the inlet side of the main valve as in the case of the relief valves shown in Figures 1 to 5)
Figure 9:
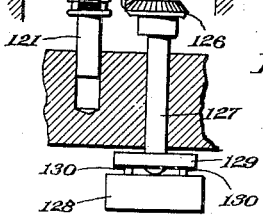
Figure 7:
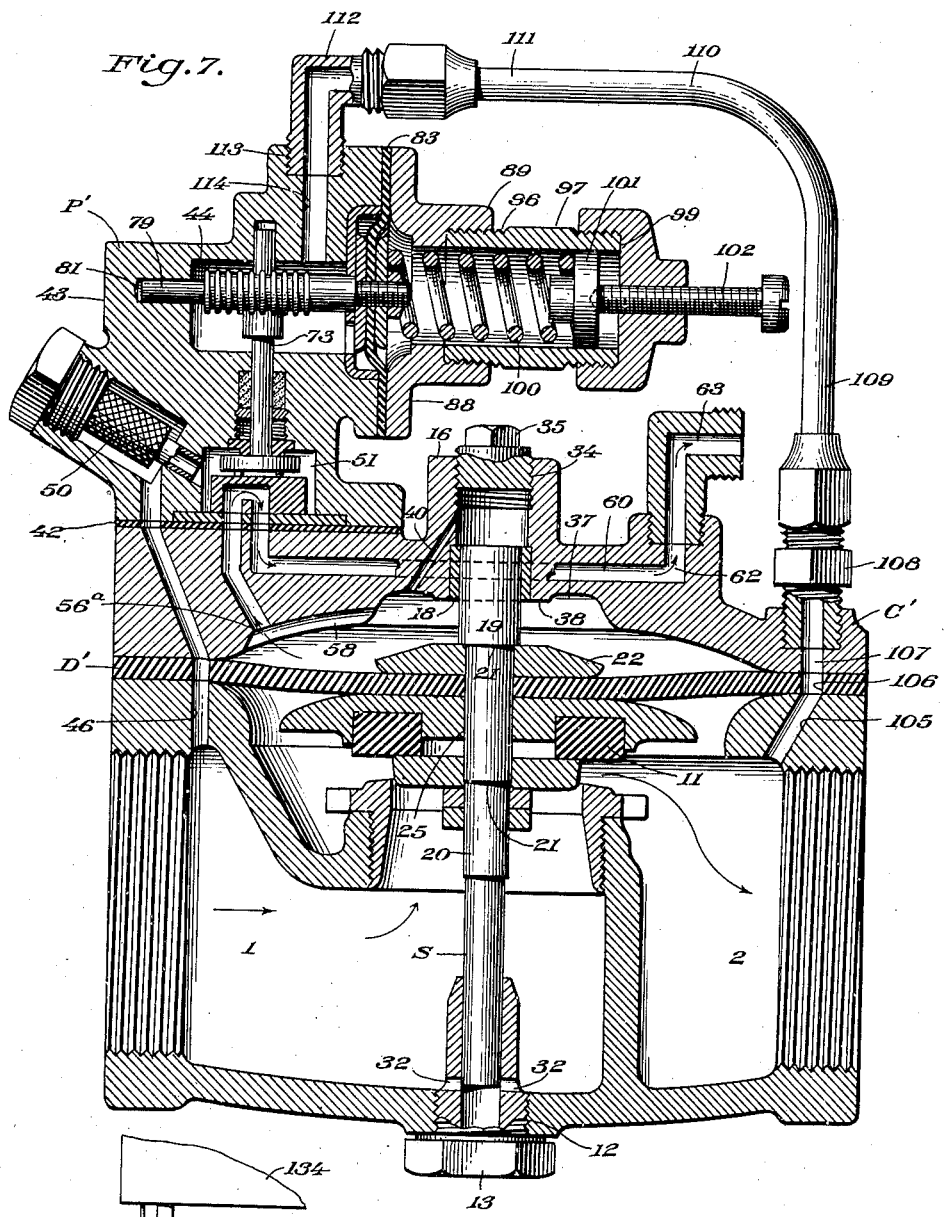
Figure 7 is a view of the same valve, but showing the main valve in the act of opening.
Figure 8:
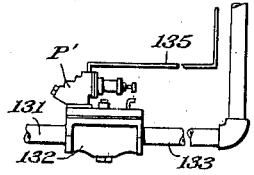
Figure 14:
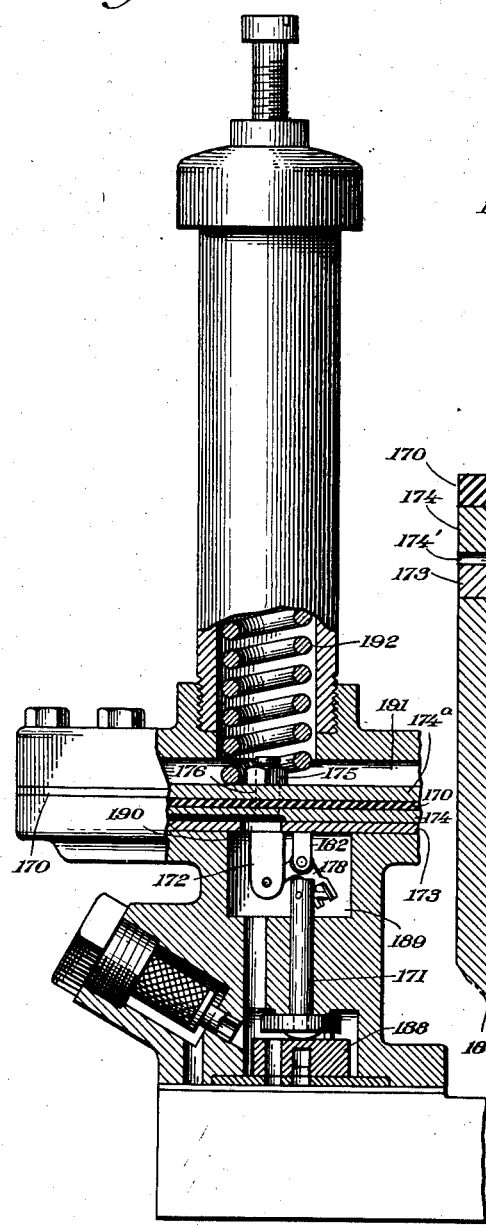
Figure 16:
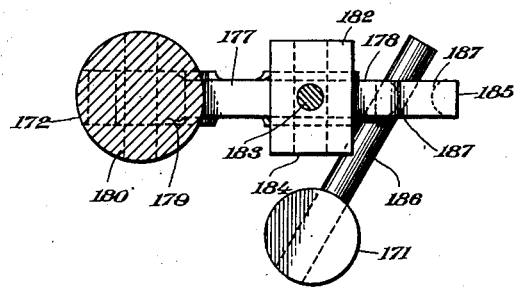
Figure 15:
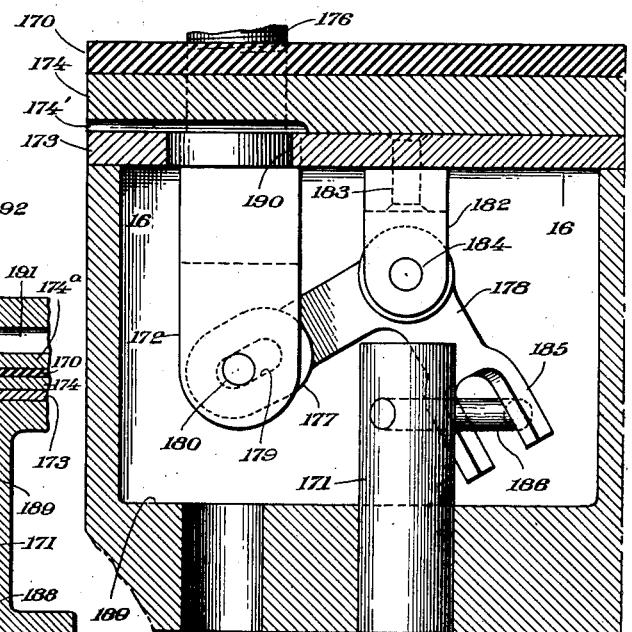

Figure 8 diagrammatically illustrates the use of a pressure regulator valve, such as shown in Figures 6 and 7, as an altitude valve;

Figure 9 diagrammatically illustrates a modified form of actuating means for the pilot valve in which the diaphragm is arranged in a horizontal plane instead of vertically;

Figure 10 illustrates a portion of a pressure relief valve having a modified pilot valve with another type of pilot disc actuating means comprising a horizontal diaphragm and a pair of cam slots;

Figure 11 is an enlarged detail sectional view taken on the line 11—11 of Figure 10;

Figure 12 is an enlarged detail view of the cam slot shown in Figure 10;

Figure 13 is a modification of the pilot disc actuating cam means shown in Figures 10, 11 and 12;

Figure 14 illustrates another pressure relief valve with a mechanical linkage for actuating the pilot disc;

Figure 15 is an enlarged view of the pilot disc actuating means shown in Figure 14; and Figure 16 is a sectional view taken on the line 16—16 of Figure 15.

Figure 1:
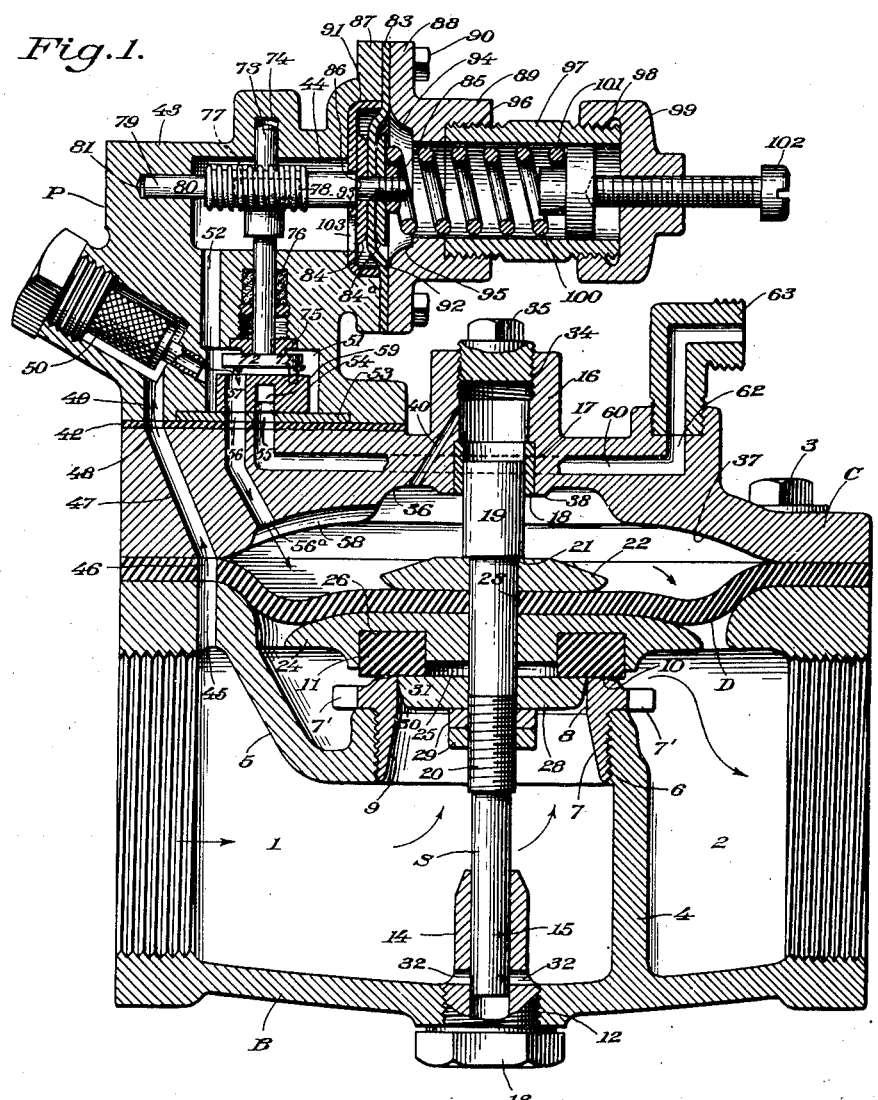
Figure 1 is a transverse sectional view through the body of a main relief valve and a pilot valve for controlling the main valve, said main valve being in its closed position with the pilot disc and diaphragm of the pilot valve in a corresponding position.
Figure 4:
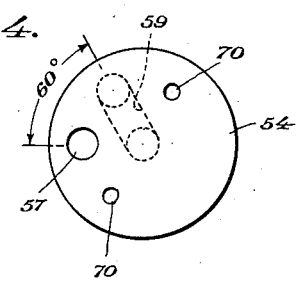
Figure 4 is an enlarged plan view of the pilot disc employed in the valve of Figure 1.

Referring now to Figure 1 of the drawings, the letter B indicates the body of the relief valve and the numerals 1 and 2, respectively, indicate the inlet and outlet chambers of the valve. The letter C indicates a cover for the main valve and the letter D indicates a circular diaphragm whose marginal portion is clamped between the body B and the cover C by any suitable number of cap screws 3.

The valve body B is provided with a substantially vertical partition wall 4 which cooperates with an inclined partition 5 to provide the inlet and outlet chambers 1 and 2 previously referred to. The wall portions 4 and 5 are merged to provide a circular opening 6 which is threaded and adapted to receive an annular valve seat 7. The valve seat 7 is provided with a circular opening 8 which flares outwardly toward the bottom of the valve seat, as indicated at 9. The upper surface of the valve seat 7 adjacent the opening 8 is provided with a declining beveled portion 10 adapted to cooperate with a valve disc 11 to form a leak-proof seal, as will be explained more fully hereinafter. The valve seat 7 is further provided with circumferential projections 7' adapted to be engaged by a spanner wrench for tightly securing the seat in the threaded opening 6.

The valve body B has a threaded opening 12 axially aligned with the opening 8 in the valve seat 7. An elongated plug 13 is threaded into the opening 12 and includes a tubular guide portion 14 for the lower end 15 of a valve stem S.

The cover member C is provided with a central boss portion 16 counterbored at 17 to receive a guide bushing 18 for the upper end 19 of the valve stem S. The bushing 18 is arranged so that it is in axial alignment with the plug 13 and serves as a guide for the upper end of the valve stem.

The valve stem S has a threaded portion 20 intermediate its lower end 15 and its upper end 19. The end 15 is of slightly less diameter than the threaded portion 20 and has a snug sliding fit in the tubular portion 14 of the plug 13. The upper end 19 of the valve stem is enlarged to provide a shoulder at 21 and, moreover, is snugly guided in the bushing 18. Thus, the plug 13 and bushing 18 are arranged to guide the valve stem S during vertical movement.

An upper diaphragm supporting plate 22 is adapted to be received upon the stem S and to abut the shoulder 21 with the upper side thereof. The upper side of the diaphragm D is engaged with the lower side of the plate 22 and is provided with an aperture 23 through which the valve stem S extends. The lower side of the diaphragm D is adapted to engage the upper side of a lower diaphragm supporting plate 24 and the valve stem S extends through a central hole 25 in said plate. The lower supporting plate 24 is also provided with a channel 26 formed in the lower side thereof to receive the valve disc 11 previously referred to. A combined clamping member and choke washer 28 is adapted to be mounted upon the stem S and to engage the inner marginal portion of the valve disc 11. Clamping nuts 29 are threaded upon the portion 20 of the valve stem S and serve to retain the valve stem, the diaphragm supporting plates 22 and 24, the valve disc 11, and the choke washer 28 in assembled relation with the diaphragm D.

The peripheral portion of the choke waser 28 is preferably rounded as indicated at 30, and is tapered optwardly and upwardly from the rounded portion to substantially its upper outer edge as indicated at 31. The rounded and tapered peripheral portions serve to gradually cut off the flow through the valve seat opening 8 and to reduce eddying, and the beveled portion 10 of the valve cooperates with the valve disc 11 to form a theoretical line contact seal, whereby quiet, smooth and chatterless operation of the valve is obtained.

The tubular guide 14 for the lower end of the valve stem is pierced by one or more transverse openings 32 to permit the ready escape of any fluid contained in said guide so as not to interfere with the free movement of the valve stem.

The boss 16 of the cover member C is provided with a threaded opening 34 adapted to receive a plug 35. The cover C is further provided with a cavity 36 shaped to receive the upper diaphragm supporting plate 22 when the main valve is in open position. The cavity 36 forms a portion of a pressure chamber 37 adapted to receive fluid under pressure for actuating the diaphragm D. The bushing 18 is arranged to cooperate with an adjacent boss 38 to limit the opening movement of the stem of the main valve by engagement of the upper diaphragm supporting plate 22 therewith. A passageway 40 is formed in the cap C to establish communication between the pressure chamber 37 and the space between the upper portion of the valve stem S and the plug 35.

A pilot valve generally indicated by the letter P is mounted on the cover C by suitable cap screws 41. A gasket 42 is clamped between the pilot valve and the cover to prevent leakage therebetween. The pilot valve comprises a housing 43 containing a main pressure chamber 44 which is continuously subject to the pressure of the fluid in the inlet chamber 1 of the main valve, the fluid being conducted from said inlet chamber through a passageway 45 in the body B, an opening 46 in the diaphragm D, a passageway 47 in the cover C, an opening 48 in the gasket 42, a passageway 49 in the housing 43, through a strainer 50 into a pilot disc chamber 51 and thence through a passageway 52 into the pilot pressure chamber 44. The strainer 50 prevents the entrance of foreign matter into the pilot valve with the operating fluid and thus assures trouble-free operation and non-clogging of the pilot valve.

The pilot disc chamber 51 is formed at the lower end of pilot valve housing 43, the open end of which chamber is closed by a plate 53 serving as the seat for a pilot valve disc 54. The plate 53 may be secured to the pilot valve housing in any convenient manner. The plate 53 is provided with a central port 55 and a port 56 spaced a predetermined radial distance from the port 55. The gasket 42, of course, is provided with openings that register with the ports 55 and 56.

As shown in Figure 1, the pilot valve disc 54 is provided with a through passageway 57 adapted to place the chamber 51 in communication with the diaphragm chamber 37 of the main valve. The under side of the cover C is provided with a groove 58 which merges with a passage 56ª in said cover so as to assure entrance of operating fluid into the diaphragm chamber 37 to effect closing of the valve even though the diaphragm, when the valve is in its open position, happens to be in contact with the surfaces defining said chamber.

Figure 5:
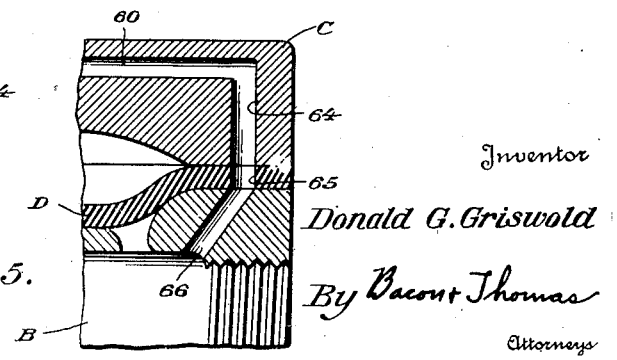
Figure 5 is a fragmentary detail view illustrating the manner in which spent operating fluid from the main valve may be returned to the outlet side of said valve instead of being discharged to the atmosphere or to a suitable drain.

The pilot disc 54 is also provided with a U-shaped passageway 59 arranged so that, when said pilot disc assumes the position shown in Figure 2, it will establish communication between the ports 55 and 56 and thus permit the escape of spent operating fluid from the diaphragm pressure chamber 37. A passageway 60 for exhaust fluid is accordingly provided in the cover C and one end 61 is arranged to register with the port 55 and its opposite end 62 may be arranged to exhaust to the atmosphere through a fitting 63. Any conventional tubing (not shown) may be connected to the fitting 63 for conducting exhaust operating fluid to a suitable drain. However, instead of exhausting such fluid to the atmosphere or conducting it into a drain, the same may be discharged into the outlet side of the valve by the arrangement of passageways shown in Figure 5. As illustrated, the passageway 60 is shown communicating with a downwardly extending passageway 64 in the cover C. An opening 65 is provided in the diaphragm D and a further passageway 66 opens into the outlet chamber of the valve body B.

Reverting to Figure 1, the pilot disc 54 is provided with apertures 70 adapted to receive pins 71 depending from a drive washer 72. The drive washer 72 is mounted upon one end of a vertical shaft 73, the opposite end of the shaft being guided in a recess 74 formed in the pilot valve housing 43. The end of the shaft 73 adjacent the drive washer 72 is guided by a bushing 75.

In order to adapt the pilot valve P for use with either a relief valve or a pressure regulator valve, the shaft 73 may be packed as indicated at 76 to prevent leakage between chambers 44 and 51, although it will be apparent that, in Figure 1, such packing is unnecessary because of the interconnection of the two chambers by the passageway 52. However, when the passageway 52 is omitted, the packing 76 serves its intended purpose as will be apparent from Figures 6 and 7.

A spur gear 77 is fixedly secured to the shaft 73 and is arranged so as to mesh with annular ridges 78 formed upon a rod 79 extending at right angles to the shaft 73. The rod 79 is necessarily offset from the shaft 73 as shown in Figure 3. One end 80 of the rod 79 is guided in a recess 81 in the pilot valve housing 43 and the opposite end 82 of said rod is reduced and threaded and connected with a flexible diaphragm 83. Clamping plates 84 and 84ª are disposed upon opposite sides of the diaphragm 83 and a nut 85 clamps the diaphragm between said plates, one of said plates abutting a shoulder 86 on the rod 79.

The marginal portion of the diaphragm 83 is secured between a flange 87 formed at one side of the pilot valve housing 43 and a flange 88 formed upon a fitting 89. Cap screws 90 secure the fitting 89 to the housing 43 and further serve to clamp the diaphragm 83 in position.

The portion of the pilot valve housing 43 adjacent the flange 87 is provided with a cavity 91 in which a cup shaped stop element 92 is seated. The stop element 92 is provided with a central opening 93 through which the rod 79 slidably extends. The fitting 89 is also provided with a cavity 94 having a bottom constituting a shoulder 95. When the main valve shown in Figure 1 is in its closed position, one of the plates 84 engages the cup shaped stop element 92, and when the main valve is opening or in its fully opened position, the other plate 84ᵃ engages the shoulder 95. Thus, the travel of the rod 79 is limited in both directions.

The fitting 89 is adapted to threadedly receive one end 96 of a threaded pipe nipple 97. The opposite end 98 of said nipple is threaded to receive a cap member 99. A spring 100 is received in the nipple 97 and one end of said spring engages the adjacent plate 84ᵃ and the opposite end of said spring engages a circular plate 101 slidably mounted in said nipple. An adjusting screw 102 is threadedly mounted in the cap 99 and engages the plate 101 to place any desired initial compression load upon the spring 100. The nipple 97 may be a standard pipe nipple and hence comparatively cheap and readily available. The use of a standard pipe nipple as a chamber for the adjustable spring of the valve makes it possible to quickly provide chambers of various lengths to accommodate a considerable variety of spring lengths to meet various conditions encountered in practice.

The automatic operation of the pressure relief valve shown in Figures 1 to 5 is as follows: Pressure fluid from the inlet chamber 1 of the main valve passes into the pilot disc chamber 51 and the main pressure chamber 44 of the pilot valve housing in the manner previously described herein. With the pilot disc 54 in the position shown in Figure 1, pressure fluid is free to enter the diaphragm chamber 37 of the main valve to close the valve and maintain the valve disc 11 against its seat. The main valve will remain closed until the pressure in the inlet chamber 1 closely approaches that for which the spring 100 has been adjusted. Should an increase in pressure above the predetermined maximum occur, it will be transmitted from the chamber 44, through an opening 103 in the cup shaped stop member 92 to act against the diaphragm 83 of the pilot valve. The pressure on the diaphragm 83 will then gradually compress the spring 100 to the extent permitted by the shoulder 95 which limits the travel of the rod 79, as hereinbefore described. As the rod 79 moves from the position shown in Figure 1 to that shown in Figure 2, the ridges 78 on said rod will cause the spur gear 77 to rotate the shaft 73 and thus turn the pilot disc 54 counterclockwise (as viewed in Figure 4) through the drive washer 72 and pins 71 to ultimately bring the pilot disc 54 to the position shown in Figure 2, at which time the diaphragm pressure chamber 37 in the main valve is open to exhaust by registry of the U-shaped passageway 59 in said pilot disc with the ports 56 in the valve seat 53.

Inasmuch as the diaphragm movement is very short and the force required to rotate the pilot disc 54 is ordinarily no more than a few ounces, the pressure in the chamber 44 of the pilot valve can therefore very closely approach that for which the spring 100 has been adjusted, and the valve is thus made very sensitive and accurate. Therefore, only a slight pressure in excess of that for which the spring 100 is set need be applied to effect complete opening of the valve. In one form of the invention, the shaft 73 need only be oscillated through an angle of approximately 60° to position either the port 57 or the U-shaped passageway 59 of the pilot disc 54 in registration with the port 56 in the valve seat 53. This feature is graphically illustrated by Figure 4 wherein the through port 57 is shown on a radius at an angle of 60° relative to that on which the U-shaped exhaust passageway 59 is formed. This angle is not critical and may be varied as desired within practical limits.

It will be apparent from the foregoing that when the main valve is open it is wide open and that the rate of flow through said valve is not retarded or restricted in any way by the adjustable spring 100. Hence, there is no tendency for the valve to flutter or slap and quiet operation is assured. It will further be apparent that upon a sufficient drop in pressure in the pipe line (not shown), the spring 100 will force the diaphragm 83 toward the left to its original position shown in Figure 1. This movement of the diaphragm necessarily actuates the rod 79 connected thereto so that said rod operates the pilot disc 54, causing said disc to turn clockwise (as viewed in Figure 4) to ultimately position the through port 57 of said disc in registration with the port 56 in the seat 53 (as shown in Figure 1) to effect automatic closing of the valve by the line pressure itself.

The pressure regulating valve shown in Figures 6 and 7 is quite similar in construction to the relief valve shown in Figures 1 to 4, inclusive. However, there are certain fundamental structural differences between the two types of valves, and these differences will be pointed out hereinafter. For convenience, corresponding parts in Figures 6 and 7 have been given the same numerals as in Figures 1 to 4.

As before indicated, the passageway 52 is omitted from the pilot valve housing of Figures 1 and 2 to adapt the same for use with a pressure regulating valve. Thus, as shown in Figures 6 and 7, there is a solid wall between the pilot disc chamber 51 and the main pressure chamber 44 of the pilot valve. With the omission of the passageway 52, the pilot valve is no longer responsive to the pressure in the inlet chamber or opening 1. Therefore, in order to make the pilot valve responsive to the pressure conditions in the outlet chamber or opening 2 of the main valve, which is desired, this chamber is connected with the main pressure chamber 44 of the pilot valve. Thus, a passageway 105 is formed in the body of the valve and this communicates with an opening 106 in a diaphragm D' and a passageway 107 in the cover C'. A fitting 108 is threaded into the cover C' and one end 109 of a tube 110 is connected with said coupling. The opposite end 111 of said tube is connected with a fitting 112 threaded into an opening 113 provided in the housing of a pilot valve P'. A passageway 114 establishes communication between the fitting 112 and the main pressure chamber 44 of the pilot valve. Thus, the diaphragm 83 of the pilot valve will now be actuated in response to pressure conditions in the outlet chamber or opening 2 of the main valve instead of to the pressure in the inlet opening 1.

A further change necessary to convert the relief valve to an automatic pressure regulating valve is that the position of the pilot disc 54 must be shifted with respect to its seat so as to bring the through passageway 57 and the U-shaped exhaust passageway 59 in said pilot disc into proper registration with the port 56 in the valve seat 53. The necessity for shifting the position of the pilot disc 54 will be apparent when it is considered that in a pressure regulating valve the pressure in the outlet side of the valve is continuously communicated to the pilot valve and this pressure must be greater than the load on the spring 100 when the main valve is in closed position, which is contrary to the case of the relief valve, as will be clear from a comparison of Figure 6 with Figure 1.

As shown in Figure 6, the rod 79 for actuating the pilot disc 54 has been shifted toward the right as far as the shoulder 95 in the fitting 89 will permit when the main valve is in the closed position. In contrast, when the pressure relief valve is closed, the same rod is moved as far to the left as the cup-shaped stop element 92 will permit, as is clearly shown in Figure 1. Stated another way, the pilot disc 54 in the pressure regulating valve (of Figure 6) must be rotated counterclockwise to effect closing and returned clockwise to effect opening of the main valve; whereas, in the relief valve (of Figure 1) the pilot disc must be rotated clockwise to effect closing and returned counterclockwise to effect opening of the main valve.

Here again, the action of the main valve is extremely sensitive, and upon a pressure drop of only a few ounces below that which is desired on the outlet side of the valve, the spring 100 will move the diaphragm 83 and the rod 79 connected therewith toward the left (see Figure 7), thereby rotating the pilot disc 54 counterclockwise to permit the wide opening of the valve. This movement of the rod 79, of course, positions the U-shaped exhaust passageway 59 so as to allow the spent operating fluid to drain from the diaphragm pressure chamber 37 through the passageway 60 and the fitting 63 to the atmosphere or to any drain connected with said fitting. As the pressure again builds up in the outlet opening 2 of the main valve, the same will be communicated to the chamber 44 in the pilot valve housing and will act against the diaphragm 83 moving it toward the right to compress the spring 100 to effect a return of the pilot valve disc 54 to the position shown in Figure 6. Actual closing of the main valve is effected by the fluid under pressure introduced into the pilot disc chamber 51 from the inlet opening or chamber 1 of the main valve.

Figure 8 diagrammatically illustrates a pressure regulator valve, of the type shown in Figures 6 and 7, arranged as an altitude valve and connected with an elevated water storage tank for automatically controlling the liquid level in said tank through hydrostatic pressure. A supply pipe 131 is connected to the valve 132 and a discharge pipe 133 connects said valve with a suitable tank or reservoir 134. The static head of the liquid in the tank 134 is transmitted through a relatively small tube 135 to the main pressure chamber of the pilot valve P'. It will be apparent from the foregoing description that, as the liquid level varies in the tank 134, the fluid pressure acting upon the diaphragm of the pilot valve will correspondingly vary so that the main valve will be automatically opened or closed as conditions require. A suitable spring or adjustment will, of course, be made to meet the requirement of the head under which the valve is to operate. The obvious advantage of the present altitude valve over a float-controlled valve is that the liquid level may be readily controlled even under conditions where there is a tendency for ice to form on the surface of the water in the tank. Under such circumstances, the float mechanism may be damaged or rendered inoperative, and thereby fail to replenish the supply of water in the tank. Such ice cannot in any way affect or interfere with the operation of the present altitude valve.

It has been found desirable in several instances to employ a diaphragm in the pilot valve housing arranged horizontally, instead of vertically, to actuate the pilot disc 54. The horizontal arrangement of the diaphragm has the advantage that its size is not limited by the proximity of the main valve as is the case with the vertical diaphragm. In order to obtain this advantage, various means are disclosed herein for operatively connecting the pilot disc with a horizontal diaphragm in the pilot valve housing.

Figure 9 diagrammatically illustrates a gear mechanism for oscillating the pilot disc through the desired angle to effect opening and closing of the main valve by means of a horizontally disposed diaphragm 120. The diaphragm 120 may be connected to an actuating rod 121 similar to and in the manner illustrated in Figure 6. The ridges or teeth 122 on the rod 121 are arranged to engage a spur gear 123 mounted upon a horizontal shaft 124. The shaft 124 carries a bevel gear 125 which meshes with a bevel gear 126 on the pilot disc drive shaft 127. The drive from the shaft 127 to the pilot disc 128 is of the type heretofore described, namely, through a drive washer 129 and pins 130.

Figure 10 illustrates a portion of a pressure relief valve arranged to be actuated by a horizontally disposed diaphragm 140, the peripheral portion of which diaphragm is clamped between a flange 141 of a pilot valve housing 142 and a cover plate 143. The housing and cover plate are secured together by a suitable number of cap screws 144. The diaphragm 140 is axially aligned with a pilot disc drive shaft 145. A rod 146 has a reduced end 146$^a$ extending through washers 147 and 147$^a$ on opposite sides of the diaphragm. The rod 146, diaphragm 140 and washers 147—147$^a$ are held together by means of a nut 148 threaded upon a reduced end 146$^a$ of said rod. The rod 146 slidably extends through an opening 148 in a cup-shaped spacer 149 and is hollowed out to telescope with the upper end of the pilot disc drive shaft 145. A drive washer 151 secured to said drive shaft transmits rotation of the shaft to a pilot disc 150 by means of pins 152 in the manner previously described.

A pin 153 extends diametrically through the shaft 145 and its ends project into diagonal cam slots 154 cut in the rod 146. The rod 146 is preferably constrained against rotation, and this may be conveniently done by flattening opposite sides of the rod as indicated at 155 in Figure 11 and making the opening 148 in the spacer 149 of corresponding contour. The cam slots 154 are so shaped that, upon movement or travel of the rod 146 from one extreme limit to the other, the pilot disc 150 will be rotated from a position allowing closing of the main valve to one which will permit full opening of said valve. To facilitate correlation of the rod 146 with the pilot disc 150, said pilot disc, with its through port 156 and U-shaped exhaust passageway 157, has been shown by dot and dash lines in Figure 11.

The lowermost washer 147 (see Figure 10) is shown in engagement with the cup-shaped stop member 149 which limits the downward travel of the diaphragm 140. When the diaphragm is in this position, the through passage 156 of the pilot disc 150 is positioned so that operating fluid may enter the diaphragm pressure chamber 37 of the main valve to effect closing of said valve. After a sufficient pressure has been built up in the pipe line (not shown) and in inlet side of the valve, the diaphragm 140 will start to move upwardly as the result of the admission of pressure fluid through an opening 158 in the stop member 149 into the diaphragm chamber 159 of the pilot valve. The entrance of the fluid may be facilitated if desired by a groove 147' cut in the lower face of the lower washer 147. Continued increase in pressure will finally cause the upper washer 147a to engage the cover 143 and thereby limit upward movement of the diaphragm. Inasmuch as the rod 146 is connected with the diaphragm, its travel will correspond to that of said diaphragm. Accordingly, as the non-rotatable rod 146 is moved upwardly, the cam slots 154 acting on the ends of the pin 153 will cause the drive shaft 145 to be rotated in a counterclockwise direction, as indicated by the arrow in Figure 11, to place the U-shaped exhaust passageway 157 of the pilot disc 150 in position to drain the spent operating fluid from the chamber 37 of the main valve and thereby allow said valve to open. Downward movement of the rod 146 will obviously rotate the pilot disc 150 in the reverse direction. While two cam slots 154 have been shown, it will be understood that one cam slot cooperating with one end of the pin 153 may be used if desired.

Figure 13 illustrates a different type of cam for actuating the pilot disc drive shaft. As shown, a rod 160 telescopes a pilot disc drive shaft 161 having a pin 162 extending diametrically therethrough. A lower side portion of the rod 160 is cut away to provide cam surfaces 163 and 164 adapted to cooperate with the projecting ends of the pin 162. The rod 160 is adapted to be reciprocated by a diaphragm in a manner similar to the rod 146, while being constrained against rotation. Consequently, the cam surface 163 will cause the pilot disc shaft 161 to be rotated in a counterclockwise direction when the rod 160 is moved upwardly, and the cam surface 164 will cause said shaft to be rotated in a clockwise direction when said rod is moved downwardly. The cam arrangement shown in Figure 13 has the advantage (over that shown in Figure 12) of facilitating assembly, in that the rod 160 may be slipped longitudinally over the shaft 161 after the pin 162 has been mounted in said shaft; whereas, the pin 153 of Figure 12 must be mounted in the shaft 145 after the rod 146 has been telescopically arranged relatively to said shaft.

It will be noted from Figure 10 that the horizontal diaphragm arrangement permits the use of a diaphragm of larger diameter than that shown in Figures 1 to 7 without any increase in the height of the pilot valve housing. This view also illustrates the convenience with which a longer spring 165 may be positioned in a suitable standard pipe nipple 166 to meet various conditions encountered in practice.

Figure 14 illustrates a pilot valve somewhat similar to that shown in Figure 10, but utilizing a mechanical linkage instead of a cam for oscillating the drive shaft of the pilot disc. With the arrangement illustrated, the axis of the diaphragm 170 of the pilot valve is offset relative to the axis of the pilot disc drive shaft 171. Here again, a rod 172 is slidably mounted in a cup-shaped spacer 173, but for obvious reasons it is immaterial that the rod 172 be constrained from rotation by the spacer 173. The rod 172 is connected with the diaphragm 170 and washers 174 and 174a by means of a nut 175 threaded upon a reduced portion 176 of said rod. The lower end of the rod 172 is preferably bifurcated to receive the end of an arm 177 of a bell crank 178. The extremity of the arm 177 is provided with an elongated slot 179, and a pin 180 extends through said slot and is carried by the bifurcated end of the rod 172. The bell crank 178 is pivotally mounted upon a support which may take the form of a bracket 182 secured by a rivet 183 or other means to the spacer 173. A pin 184 forms a pivotal mounting for the bell crank 178 on the bracket 182. The second arm 185 of the bell crank 172 is forked, as clearly shown in Figure 15, and is adapted to engage a rigid arm 186 extending radially from the pilot disc drive shaft 171. The inner surfaces of the legs comprising the forked end of the arm 185 are preferably rounded, as best indicated at 187 in Figure 16, to accommodate the angular movement of the rigid arm 186 necessary to effect oscillation of the pilot disc 188 from open to closed position, and vice versa.

It will be apparent from Figures 14 to 16 that, as the fluid pressure builds up in the main pressure chamber 189 of the pilot valve, the same will be communicated through an opening 190 in the spacer 173 to the diaphragm chamber 191 in the pilot valve housing and move the diaphragm against the opposing action of the spring 192 to effect a closing of the main relief valve (not shown). The entrance of fluid into the chamber 191 may be facilitated if desired by a groove 174' cut in the lower face of the lower washer 174. As the diaphragm 170 moves upwardly, the rod 172, of course, will move therewith, and upward movement of said rod will cause an angular movement of the bell crank 178 about its pivot 184 and thus cause the forked end 185 of said bell crank to move the rigid arm 186 through the desired angle and thereby cause the pilot disc drive shaft 171 to be correspondingly rotated to position the pilot disc 188 so that pressure fluid may flow into the diaphragm pressure chamber of the main valve to effect closing of said valve.

While various forms of the valves comprising the invention have been disclosed, and while various mechanisms for operating the pilot disc by either a horizontal or vertical diaphragm have also been disclosed, it will be understood that various modifications and changes may be made therein without departing from the spirit of the invention.

I claim:

1. A pilot valve for controlling a main valve comprising: a housing; a pressure chamber and a pilot disc chamber in said housing arranged in superimposed relation; a horizontal partition in said housing separating said chambers and forming the bottom wall of said pressure chamber and the top wall of said pilot disc chamber; passage means in said housing for admitting fluid under pressure into said chambers, one end of said pressure chamber being enlarged to provide a pilot diaphragm chamber; a pilot diaphragm extending across said pilot diaphragm chamber arranged so that one side thereof is constantly subject to the pressure of the fluid in said pressure chamber; means on the opposite side of said pilot diaphragm yieldably opposing flexing thereof in one direction; a rotatable ported pilot disc in said pilot disc chamber for controlling the flow of operating fluid from said pilot disc chamber; a ported member forming a closure for the lower end of said pilot disc chamber and providing a seat for said pilot disc; means for actuating said pilot disc in accordance with the flexing movements of said pilot diaphragm, including an element connected with said pilot diaphragm and extending therefrom into said pressure chamber and arranged to be reciprocated by said pilot diaphragm, a rotatable vertical drive shaft journaled in said horizontal partition and having one end thereof connected with said pilot disc in said pilot disc chamber and its other end extending into said pressure chamber, and means in said pressure chamber between said element and said drive shaft for converting reciprocatory movement of said element into rotary movement of said drive shaft and pilot disc; and stop means for limiting flexing of said pilot diaphragm in opposite directions.

2. A pilot valve for controlling a main valve comprising: a housing; a pressure chamber and a pilot disc chamber in said housing arranged in superimposed relation; a horizontal, imperforate partition in said housing separating said chambers and forming the bottom wall of said pressure chamber and the top wall of said pilot disc chamber; separate passage means in said housing for admitting fluid under pressure into said chambers, respectively, one end of said pressure chamber being enlarged to provide a pilot diaphragm chamber; a pilot diaphragm extending across said pilot diaphragm chamber arranged so that one side thereof is constantly subject to the pressure of the fluid in said pressure chamber; means on the opposite side of said pilot diaphragm yieldably opposing flexing thereof in one direction; a rotatable ported pilot disc in said pilot disc chamber for controlling the flow of operating fluid from said pilot disc chamber; a ported member forming a closure for the lower end of said pilot disc chamber and providing a seat for said pilot disc; means for actuating said pilot disc in accordance with the flexing movement of said pilot diaphragm including an element connected with said pilot diaphragm and extending therefrom into said pressure chamber and arranged to be reciprocated by said pilot diaphragm, a rotatable vertical drive shaft journaled in said horizontal partition and having one end thereof connected with said pilot disc in said pilot disc chamber and its other end extending into said pressure chamber, and means in said pressure chamber between said element and said drive shaft for converting reciprocatory movement of said element into rotary movement of said drive shaft and pilot disc; and stop means for limiting flexing of said pilot diaphragm in opposite directions.

3. A pilot valve for controlling a main valve comprising: a housing; a pressure chamber and a pilot disc chamber in said housing arranged in superimposed relation; a horizontal partition in said housing separating said chambers and forming the bottom wall of said pressure chamber and the top wall of said pilot disc chambers; said horizontal partition having a passageway establishing communication between said chambers; passage means in said housing for admitting fluid under pressure into at least one of said chambers, one end of said pressure chamber being enlarged to provide a pilot diaphragm chamber; a pilot diaphragm extending across said pilot diaphragm chamber arranged so that one side thereof is constantly subject to the pressure of the fluid in said pressure chamber; means on the opposite side of said pilot diaphragm yieldably opposing flexing thereof in one direction; a rotatable ported pilot disc in said pilot disc chamber for controlling the flow of operating fluid from said pilot disc chamber; a ported member forming a closure for the lower end of said pilot disc chamber and providing a seat for said pilot disc; means for actuating said pilot disc in accordance with the flexing movement of said pilot diaphragm including an element connected with said pilot diaphragm and extending therefrom into said pressure chamber and arranged to be reciprocated by said pilot diaphragm, a rotatable vertical drive shaft journaled in said horizontal partition and having one end thereof connected with said pilot disc in said pilot disc chamber and its other end extending into said pressure chamber, and means in said pressure chamber between said element and said drive shaft for converting reciprocatory movement of said element into rotary movement of said drive shaft and pilot disc; and stop means for limiting flexing of said pilot diaphragm in opposite directions.

4. A pilot valve for controlling a main valve comprising: a housing; a pressure chamber and a pilot disc chamber in said housing arranged in superimposed relation; a horizontal partition in said housing separating said chambers and forming the bottom wall of said pressure chamber and the top wall of said pilot disc chamber; passage means in said housing for admitting fluid under pressure into said chambers, one end of said pressure chamber being enlarged to provide a pilot diaphragm chamber; a pilot diaphragm extending across said pilot diaphragm chamber arranged so that one side thereof is constantly subject to the pressure of the fluid in said pressure chamber; means on the opposite side of said pilot diaphragm yieldably opposing flexing thereof in one direction; a rotatable ported pilot disc in said pilot disc chamber for controlling the flow of operating fluid from said pilot disc chamber; a ported member forming a closure for the lower end of said pilot disc chamber and providing a seat for said pilot disc; means for actuating said pilot disc in accordance with the flexing movements of said pilot diaphragm including a reciprocable rod connected at one end thereof with said pilot diaphragm and extending therefrom into said pressure chamber and having its opposite end slidably supported in said housing, a rotatable vertical drive shaft journaled in said horizontal partition and having one end thereof connected with said pilot disc in said pilot disc chamber and its other end extending into said pressure chamber, and means in said pressure chamber between said slidable rod and said drive shaft for converting reciprocatory movement of said rod into rotary movement of said drive shaft and pilot disc; and stop means for limiting flexing of said pilot diaphragm in opposite directions.

5. A pilot valve for controlling a main valve comprising: a housing; a pressure chamber and a pilot disc chamber in said housing arranged in superimposed relation; a horizontal partition in said housing separating said chambers and forming the bottom wall of said pressure chamber and the top wall of said pilot disc chamber; passage means in said housing for admitting fluid under pressure into said chambers, said housing having an enlargement providing a pilot diaphragm chamber at one end of said pressure chamber; a pilot diaphragm extending across said pilot diaphragm chamber; a generally cup-shaped member in said pilot diaphragm chamber disposed between said pilot diaphragm and the adjacent end of said pressure chamber, the bottom wall of said cup-shaped member serving as a stop to limit flexing of said pilot diaphragm in one direction and having an opening extending therethrough arranged so that one side of said pilot diaphragm is constantly subject to the pressure of the fluid in said pressure chamber; means on the opposite side of said pilot diaphragm yieldably opposing flexing thereof in the opposite direction; means limiting flexing of said pilot diaphragm in said opposite direction; a rotatable ported pilot disc in said pilot disc chamber for controlling the flow of operating fluid from said pilot disc chamber; a ported member forming a closure for the lower end of said pilot disc chamber and providing a seat for said pilot disc; and means for actuating said pilot disc in accordance with the flexing movements of said pilot diaphragm, including a slidable rod connected at one end thereof with said pilot diaphragm, said bottom wall of said cup member having a guide opening and said rod slidably extending through said guide opening into said pressure chamber, a rotatable vertical drive shaft journaled in said horizontal partition and having one end thereof connected with said pilot disc in said pilot disc chamber and its other end extending into said pressure chamber, and means in said pressure chamber between said rod and said drive shaft for converting reciprocatory movement of said rod into rotary movement of said drive shaft and pilot disc.

6. A pilot valve for controlling a main valve comprising: a housing; a pressure chamber and a pilot disc chamber in said housing arranged in superimposed relation; a horizontal partition in said housing separating said chambers and forming the bottom wall of said pressure chamber and the top wall of said pilot disc chamber; passage means in said housing for admitting fluid under pressure into said chambers, said housing having an enlargement providing a pilot diaphragm chamber at one end of said pressure chamber; a pilot diaphragm extending across said pilot diaphragm chamber; a generally cup-shaped member in said pilot diaphragm chamber disposed between said pilot diaphragm and the adjacent end of said pressure chamber, the bottom wall of said cup-shaped member serving as a stop to limit flexing of said pilot diaphragm in one direction and having an opening extending therethrough arranged so that one side of said pilot diaphragm is constantly subject to the pressure of the fluid in said pressure chamber; elongated hollow means on the opposite side of said pilot diaphragm including a stop for limiting flexing of said pilot diaphragm in the opposite direction; means in said hollow means yieldably opposing flexing of said pilot diaphragm in said opposite direction; a rotatable ported pilot disc in said pilot disc chamber for controlling the flow of operating fluid from said pilot disc chamber; a ported member forming a closure for the lower end of said pilot disc chamber and providing a seat for said pilot disc; and means for actuating said pilot disc in accordance with the flexing movements of said pilot diaphragm, including a slidable rod connected at one end thereof with said pilot diaphragm, said bottom wall of said cup member having a guide opening and said rod slidably extending through said guide opening into said pressure chamber, the opposite end of said rod being slidably supported in said housing, a rotatable vertical drive shaft journaled in said horizontal partition and having one end thereof connected with said pilot disc in said pilot disc chamber and its other end extending into said pressure chamber, and means in said pressure chamber between said rod and said drive shaft for converting reciprocatory movement of said rod into rotary movement of said drive shaft and pilot disc.

DONALD G. GRISWOLD.